United States Patent
Lee et al.

(10) Patent No.: US 10,075,643 B2
(45) Date of Patent: Sep. 11, 2018

(54) SHAKINESS CORRECTING METHOD AND APPARATUS

(71) Applicant: Samsung Electro-Mechanics Co., Ltd., Suwon-si (KR)

(72) Inventors: Jung Yoon Lee, Suwon-si (KR); Kyoung Min Jeon, Suwon-si (KR); Min Goo Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 15/094,001

(22) Filed: Apr. 8, 2016

(65) Prior Publication Data

US 2017/0048460 A1 Feb. 16, 2017

(30) Foreign Application Priority Data

Aug. 13, 2015 (KR) ........................ 10-2015-0114251

(51) Int. Cl.
*H04N 5/232* (2006.01)

(52) U.S. Cl.
CPC ..... *H04N 5/23287* (2013.01); *H04N 5/23245* (2013.01); *H04N 5/23258* (2013.01)

(58) Field of Classification Search
CPC .......... H04N 5/23287; H04N 5/23245; H04N 5/23258
USPC ..................................................... 348/208.3
See application file for complete search history.

(56) References Cited

U.S. PATENT DOCUMENTS

| | | | | |
|---|---|---|---|---|
| 5,761,545 A | * | 6/1998 | Tanaka | G03B 5/00 348/E5.046 |
| 7,840,126 B2 | * | 11/2010 | Fushida | H04N 5/23248 348/208.2 |
| 2006/0008263 A1 | | 1/2006 | Kakiuchi | |
| 2011/0031031 A1 | * | 2/2011 | Vempati | C22C 26/00 175/428 |
| 2011/0115929 A1 | * | 5/2011 | Noguchi | G03B 5/00 348/208.4 |
| 2011/0158619 A1 | * | 6/2011 | Kanayama | G02B 27/646 396/55 |
| 2015/0189184 A1 | * | 7/2015 | Hirai | H04N 5/23267 348/208.4 |

FOREIGN PATENT DOCUMENTS

| | | |
|---|---|---|
| JP | 2000-39640 A | 2/2000 |
| JP | 2011-22352 A | 2/2011 |
| KR | 10-0930119 B1 | 12/2009 |

OTHER PUBLICATIONS

Korean Office Action dated Apr. 7, 2016, in counterpart Korean Application No. 10-2015-0114251 (7 pages in English, 6 pages in Korean).

* cited by examiner

*Primary Examiner* — Shahbaz Nazrul
(74) *Attorney, Agent, or Firm* — NSIP Law

(57) ABSTRACT

A shakiness correcting method includes: generating, based on motion sensing data, first filtering data to be applied to a first mode; generating, based on the motion sensing data, second filtering data to be applied to a second mode; and selectively performing shakiness correction on one of the first filtering data and the second filtering data according to mode selection information, wherein the generating of the first filtering data and the generating of the second filtering data are performed in a mutually parallel manner.

21 Claims, 7 Drawing Sheets

SHAKINESS CORRECTING METHOD AND APPARATUS

CROSS-REFERENCE TO RELATED APPLICATION(S)

This application claims the benefit under 35 USC 119(a) of Korean Patent Application No. 10-2015-0114251, filed on Aug. 13, 2015 in the Korean Intellectual Property Office, the entire disclosure of which is incorporated herein by reference for all purposes.

BACKGROUND

1. Field

The following description relates to a shakiness correcting method and apparatus.

2. Description of Related Art

A digital imaging apparatus processes an image received through an image pickup device to generate image data. The digital imaging apparatus applies a shakiness correction technique (or an image stabilization technique) to compensate for irregularity due to user movement or a hand shaking (hand blur).

However, in conventional shakiness correction techniques, correction is performed even when an operation of moving a camera by a user is intentionally performed, such as a panning operation, before an image is actually captured, in the same manner as that of hand shaking, leading to over-correction. This lowers the accuracy of optical correction.

Another aspect of a conventional shakiness correction technique is that correction is performed by distinguishing between hand shaking and a panning operation. In this case, upon determining whether hand shaking or a panning operation is occurring, a shake correction filter factor or a panning correction filter factor is applied to a single filter according to the hand shaking or the panning operation. This requires a switch in the filter factor and stabilization of a filter output, causing a delay of a few seconds in driving a lens of the imaging apparatus for shakiness correction (or image stabilization).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to one general aspect, a shakiness correcting method includes: generating, based on motion sensing data, first filtering data to be applied to a first mode; generating, based on the motion sensing data, second filtering data to be applied to a second mode; and selectively performing shakiness correction on one of the first filtering data and the second filtering data according to mode selection information, wherein the generating of the first filtering data and the generating of the second filtering data are performed in a mutually parallel manner.

The shakiness correcting method may further include: generating the motion sensing data in response to movement of an imaging apparatus, wherein the generating of the first filtering data and the generating of the second filtering data are repeatedly and continuously performed while the motion sensing data is being generated.

The generating of the first filtering data and the generating of the second filtering data may be alternately and repeatedly performed in a time division manner.

The generating of the first filtering data may be performed by filtering the motion sensing data to a first cutoff range. The generating of the second filtering data may be performed by filtering the motion sensing data to a second cutoff range.

The first mode may be a panning mode configured to correct shakiness during panning of an imaging apparatus, the second mode may be a capture mode configured to correct shakiness while the imaging apparatus is in a substantially fixed position, and the first cutoff range may be larger than the second cutoff range.

The performing of the shakiness correction may include: setting the panning mode as a default setting of the mode selection information; and performing optical correction using the first filtering data.

The performing of the shakiness correction may include performing optical correction using the second filtering data in response to the mode selection information corresponding to the capture mode.

The performing of the shakiness correction may include: aligning a lens in a central position in response to the mode selection information being changed from information corresponding to the panning mode to information corresponding to the capture mode; and performing optical correction on the lens aligned in the central position using the second filtering data.

The performing of the shakiness correction may include: performing optical correction on a current lens position using the first filtering data in response to the mode selection information being changed from information corresponding to the capture mode to information corresponding to the panning mode.

According to another general aspect, a shakiness correcting apparatus includes: a sensor configured to generate motion sensing data in response to movement of an imaging apparatus; a first filter configured to filter the motion sensing data in a first way to generate first filtering data; a second filter configured to filter the motion sensing data in a second way to generate second filtering data; and an optical corrector configured to perform optical shakiness correction using one of the first filtering data and the second filtering data, wherein the first filter and the second filter are configured to operate in a mutually parallel manner.

The filtering of the motion sensing data in the first way may include filtering the motion sensing data to a first range. The filtering of the motion sensing data in the second way may include filtering the motion sensing data to a second range.

The first cutoff range may be larger than the second cutoff range.

The first filter and the second filter may be configured to operate alternately and repeatedly in a time division manner.

The shakiness correcting apparatus may further include a selector configured to receive the first filtering data and the second filtering data, and provide one of the first filtering data and the second filtering data to the optical corrector according to mode selection information.

The shakiness correcting apparatus may be configured to provide the first filtering data to the optical corrector in response to the mode selection information corresponding to a panning mode for correcting optical shakiness during panning of the imaging apparatus, and provide the second filtering data to the optical corrector in response to the mode selection information corresponding to a capture mode for correcting optical shakiness while the imaging apparatus is in a substantially fixed position.

The selector may be configured to set the panning mode as a default setting of the mode selection information.

The selector may be configured to provide a reset signal to the optical corrector in response to the mode selection information being changed from information corresponding to the panning mode to information corresponding to the capture mode. The optical corrector may be configured to align a lens in a central position and perform optical correction using the second filtering data, in response to receiving the reset signal.

According to another general aspect a method of generating data for shakiness correction in an imaging apparatus includes: generating first filtering data to be applied to a first shakiness correcting mode; and generating second filtering data to be applied to a second shakiness correcting mode, wherein the generating of the first filtering data and the generating of the second filtering data are performed parallel to each other.

The filtering of the motion sensing data in the first way may include filtering the motion sensing data to a first cutoff range. The filtering of the motion sensing data in the second way may include filtering the motion sensing data to a second cutoff range.

The first shakiness correcting mode may be a panning mode configured to correct shakiness during panning of an imaging apparatus. The second shakiness correcting mode may be a capture mode configured to correct shakiness while the imaging apparatus is in a substantially fixed position.

The generating of the first filtering data and the generating of the second filtering data may be alternately and repeatedly performed.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
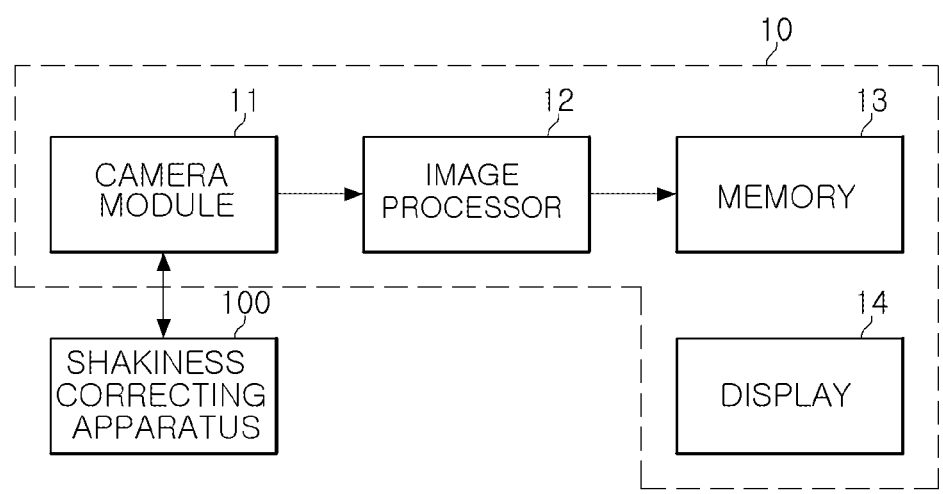
FIG. 1 is a block diagram illustrating a digital imaging apparatus employing a shakiness correcting apparatus, according to an embodiment.

FIG. 1 is a block diagram illustrating a digital imaging apparatus 10 employing a shakiness correcting apparatus 100, according to an embodiment. Referring to FIG. 1, the digital imaging apparatus 10 includes a camera module 11, an image processor 12, a memory 13, and a display 14.

The camera module 11 captures an image, and the image processor 12 processes the captured digital image from the camera module 11 to generate an image file. The image file output from the image processor 12 may be stored in the memory 13 or provided to the display 14 and displayed to a user.

The shakiness correcting apparatus 100 may be an optical image stabilization (OIS) apparatus for correcting shakiness by driving a lens (not shown) of the camera module 11.

In the example illustrated in FIG. 1, the shakiness correcting apparatus 100 and the digital imaging apparatus 10 are illustrated as separate apparatuses, but this configuration is merely illustrative. The shakiness correcting apparatus 100 may be provided as a component of the digital imaging apparatus 10, or some of components of the digital apparatus 100 may be common with the shakiness correcting apparatus 100.

Various embodiments of the shakiness correcting apparatus 100 may perform individual filtering in regard to each of a panning shakiness correction mode ("panning mode") and another shakiness correction mode, such as a capture mode, in parallel.

The panning mode refers to a mode for correcting shakiness when the digital imaging apparatus 10 is panning, e.g., moved in a direction including a horizontal movement. For example, when the digital imaging apparatus 10 is activated and moved to an imaging location to capture an image, the shakiness correcting apparatus 100 may execute the panning mode by recognizing the panning. In another example, when the digital imaging apparatus is moved in a direction including a horizontal component according to a moving subject, the shakiness correcting apparatus 100 may also execute the panning mode by recognizing the panning.

Other shakiness modes such as the capture mode (for correcting shakiness while the digital imaging apparatus 10 is maintained substantially in a fixed position to capture still images) and a video recording mode (for correcting shakiness while the digital imaging apparatus 10 is capturing motion video) are shakiness correction modes for correcting shakiness in operations in which imaging is performed. Thus, an amount of shakiness less than that of the panning mode may be realized.

Figure 2:
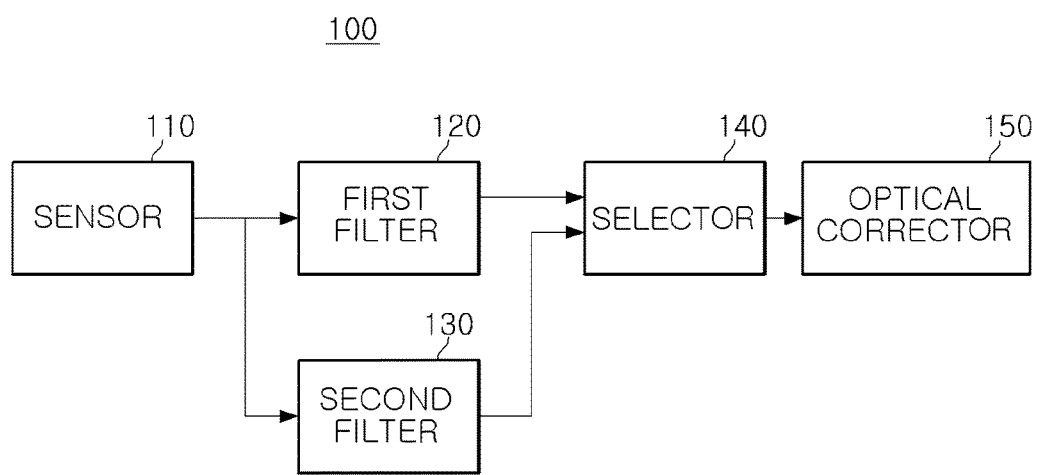
FIG. 2 is a block diagram illustrating a shakiness correcting apparatus, according to an embodiment.

FIG. 2 is a block diagram illustrating the shakiness correcting apparatus 100 according to an embodiment. Referring to FIG. 2, the shakiness correcting apparatus 100 includes a sensor 110, a first filter 120, a second filter 130, and an optical corrector 150. The shakiness correcting apparatus 100 further includes a selector 140.

The sensor 110 generates motion sensing data in response to movement of the digital imaging apparatus 10. For example, the sensor 110 may include a gyro sensor or an accelerometer.

The first filter 120 generates first filtering data used in a first mode. The first filter 120 filters the motion sensing data to a preset first cutoff range. For example, the first mode may be the panning mode.

The second filter 130 generates second filtering data used in a second mode. The second filter 130 filters the motion sensing data to a preset second cutoff range. For example, the second mode may be the capture mode. In another example, the second mode may be a video recording mode.

The first filter 120 and the second filter 130 may mutually operate independently. That is, the second filter 130 may operate in a manner unrelated to an operation of the first filter 120, and the first filter 120 may operate in a manner unrelated to an operation of the second filter 130. The two mutually independent filtering operations will hereinafter be referred to as "mutually parallel operations".

The selector 140 receives an output (the first filtering data) from the first filter 120 and an output (the second filtering data) from the second filter 130, and selectively outputs one of the first filtering data and the second filtering data according to mode section information.

The selector 140 may be a multiplexer outputting either the first filtering data or the second filtering data upon receiving the mode selection information. The mode selection information may be provided from the digital imaging apparatus 10, and may be determined by mode selection of the user, for example.

In an embodiment, when the mode selection information corresponds to the panning mode, the selector 140 outputs the first filtering data. When the mode selection information corresponds to the capture mode, the selector 140 outputs the second filtering data.

The selector 140 may set the panning mode as a default setting of the mode selection information. That is, the selector 140 may output the first filtering data unless additional mode selection information is input. In the present embodiment, a state in which driving of the imaging apparatus starts is, in many cases, a state in which imaging is prepared, rather than an imaging state, and thus, an extra mode conversion operation may be omitted by setting the panning mode as a default setting.

The optical corrector 150 performs optical shakiness correction (or optical image stabilization (OIS)) using any one of the first filtering data and the second filtering data.

The optical corrector 150 performs optical shakiness correction by controlling movement of the lens included in the digital imaging apparatus 10. Various optical shakiness correction schemes may be applied to the optical corrector 150, and thus, the optical shakiness correction scheme of the optical corrector 150 is not limited to a specific scheme.

The optical corrector 150 performs optical shakiness correction using the filtering data provided from the selector 140. The selector 140 provides one of the first filtering data output from the first filter 120 and the second filtering data output from the second filter 130 to the optical corrector 150, and the optical corrector 150 performs optical shakiness correction using the provided filtering data.

For example, when the shakiness correcting mode is switched from the panning mode to the capture mode (e.g., the mode selection information is changed from information corresponding to the panning mode to information corresponding to the capture mode), the shakiness correcting apparatus 100 aligns a lens of the imaging apparatus in a central position within a movement range of the lens and perform optical shakiness correction according to the capture mode.

In detail, when the shakiness correcting mode is switched from the panning mode to the capture mode, the selector 140 provides a reset signal to the optical corrector 150. When the reset signal is received, the optical corrector 150 aligns the lens of the imaging apparatus to a central position within a movement range of the lens. Thereafter, the optical corrector 150 performs optical correction in the capture mode using the second filtering data provided from the selector 140.

For example, when the shakiness correcting mode is switched from the capture mode to the panning mode (e.g., the mode selection information is changed from information corresponding to the capture mode to information corresponding to the panning mode), the shakiness correcting apparatus 100 does not align the lens of the imaging apparatus, but instead performs optical shakiness correction according to the panning mode in the current lens position.

In detail, when the shakiness correcting mode is switched from the capture mode to the panning mode, the selector 140 outputs the first filtering data output from the first filter 120 to the optical corrector 150. The optical corrector 150 performs optical correction on the panning mode using the first filtering data.

One or more of the components illustrated in FIG. 2 may be included in a processor, such as a central processing unit (CPU), a microprocessor, an application specific integrated circuit (ASIC), or a field programmable gate array (FPGA). For example, the sensor 110 may be a gyro sensor module, and the first and second filters 120, 130, the selector 140, and the optical corrector 150 may be included in a processor. In another example, the first and second filters 120, 130 may be included in one processor, and the other remaining components may be included in another processor. According to another example, the processor may include a memory. In such an example, the first and second filters 120, 130 may be implemented as software modules.

In another embodiment, the components illustrated in FIG. 2 may each be configured as a separate device. For example, the components may each be configured as a separate hardware, circuit, or processor differentiated from one another.

Figure 3A:
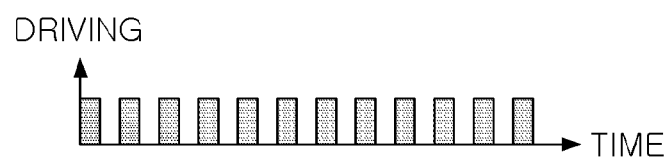
FIGS. 3A and 3B are graphs illustrating driving time of a first filter and a second filter, according to an embodiment.
Figure 3B:
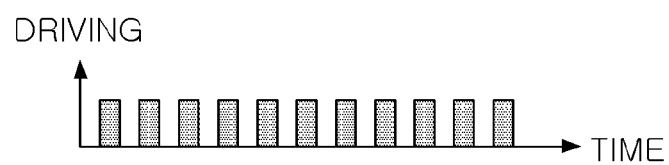

FIGS. 3A and 3B are graphs illustrating examples of a driving time of the first filter 120 and the second filter 130, respectively, according to an embodiment. As described above, the first filter 120 and the second filter 130 operate in a mutually parallel manner. In an example of operating in a mutually parallel manner, as illustrated in FIG. 3, the first filter 120 and the second filter 130 are alternately operated, repeatedly, in a time division manner.

For example, the shakiness correcting apparatus 100 is operated using an internal reference clock, and the first filter 120 and the second filter 130 may be alternately operated by time-sharing the internal reference clock. Thus, in such an example, the first filter 120 and the second filter 130 operate with a frequency of half of the internal reference clock. Since the shakiness correcting apparatus 100 generally uses an internal reference clock of a few KHz, the frequency of half of the internal reference clock at which the first filter 120 and the second filter 130 is sufficient for optical correction.

In this manner, since the first filter 120 and the second filter 130 operate in a mutually parallel manner, the first filtering data applied in the panning mode and the second filtering data applied in another mode are provided constantly, regardless of whether the panning mode is switched to another mode. As a result, even though operational mode of the digital imaging device 10 is switched, filtering conditions are not required to be changed (for example, a change in a filter factor), and thus, mode switching can be performed immediately.

Figure 4A:
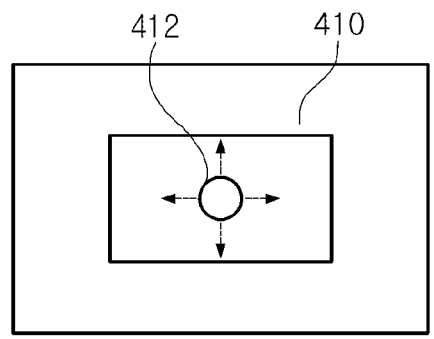
FIGS. 4A and 4B are views illustrating a filtering range of a panning mode and an imaging mode, according to an embodiment.
Figure 4B:
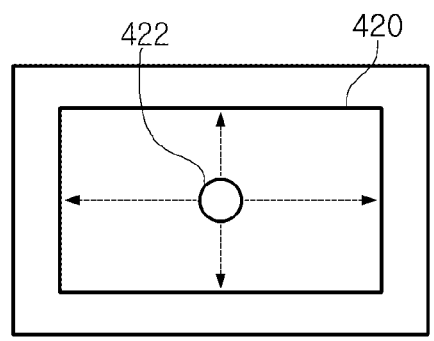

FIGS. 4A and 4B are views illustrating examples of a filtering range of a panning mode and an imaging mode according to an embodiment.

FIG. 4A illustrates a filtering range 410 of the first filter 120, and FIG. 4B illustrates a filtering range 420 of the second filter 130. In FIGS. 4A and 4B, the central circles 412, 422 are symbols corresponding to lenses, and the filtering ranges 410 and 420 are determined by a cutoff range. For example, outer regions of the filtering ranges 410 and 420 correspond to cutoff data, and the inner regions of the filtering ranges 410 and 420 correspond to post-filtering data, that is, data which has passed without being cut off.

As illustrated, the filtering range 410 of the first filter 120, that is, a first cutoff range, is larger than the filtering range 420 of the second filter 130, that is, a second cutoff range. It can be seen that the detected motion sensing data is cut off in a larger range in the panning mode than in the capture mode. Thus, since movement range of the imaging apparatus is larger in the panning mode than in the capture mode, the filtering range is increased in the panning mode to reduce the range in which optical correction is to be performed.

An embodiment of the shakiness correcting apparatus 100 having two modes (the panning mode and another mode, such as the capture mode) has been described with reference to FIGS. 2 through 4. However, the shakiness correcting apparatus 100 may have three or more modes according to other embodiments.

Figure 5:
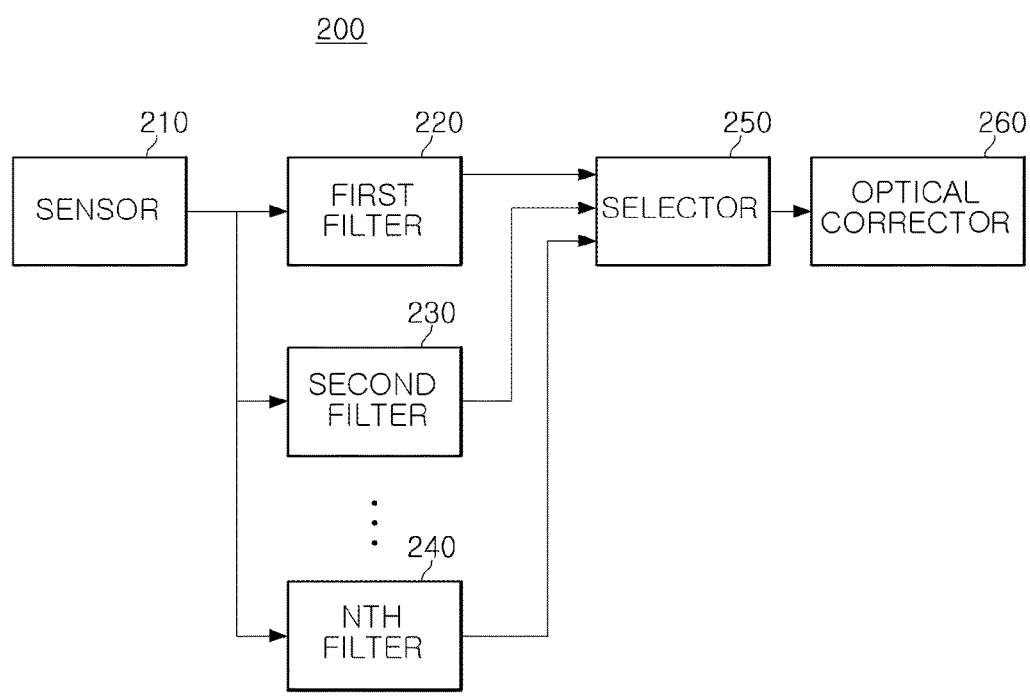
FIG. 5 is a block diagram illustrating a shakiness correcting apparatus, according to another embodiment.

FIG. 5 is a block diagram illustrating a shakiness correcting apparatus 200, according to another embodiment. The shakiness correcting apparatus 200 includes N number of filters 220 to 240 according to N number of filtering modes, as illustrated in FIG. 5.

For example, filters 220 to 240 are operated in a mutually parallel manner as described above. That is, regardless of an operation of one filter, the other filter is operated. As a result, pieces of filtering data corresponding to the shakiness correction modes are generated and maintained, and thus, optical correction can be rapidly performed even though the shakiness correction modes are frequently switched.

Other components of the shakiness correcting apparatus 200 can be understood from the above descriptions with reference to FIGS. 2 through 4.

Figure 6:
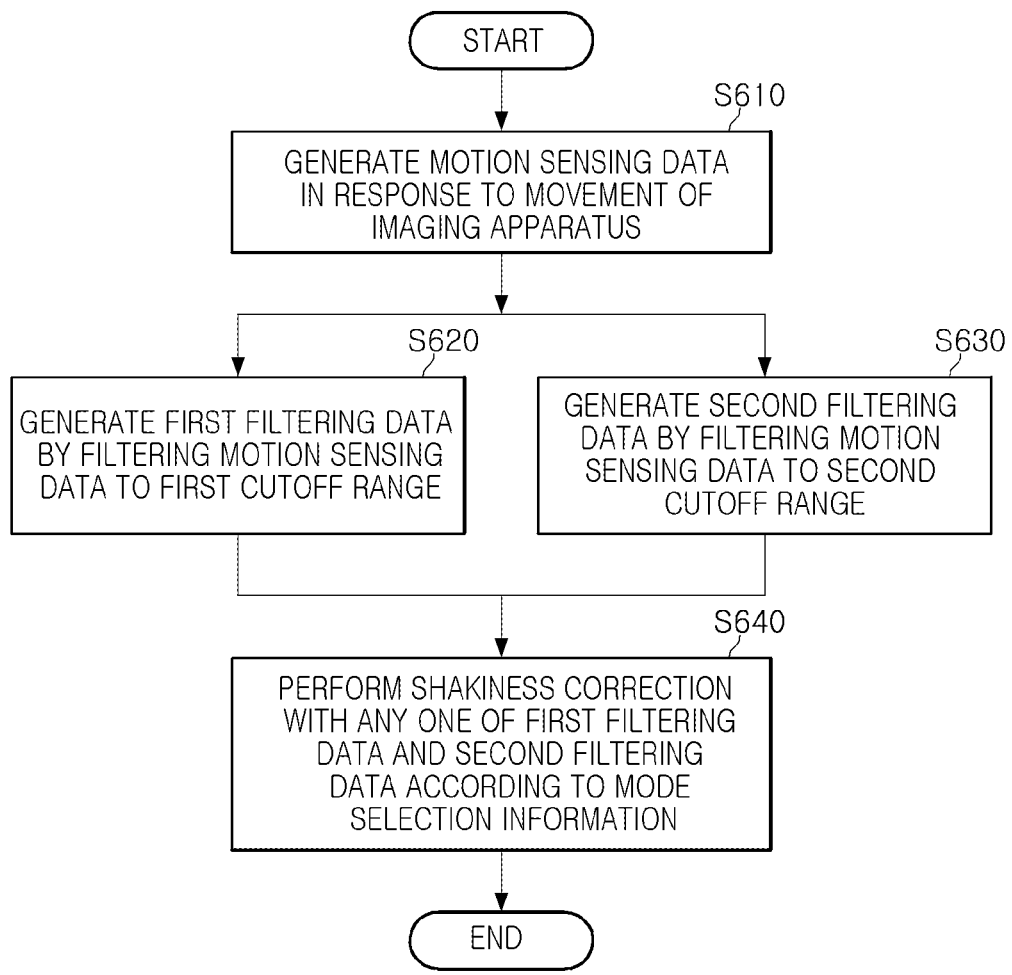
FIG. 6 is a flow chart illustrating a shakiness correcting method, according to another embodiment.

FIG. 6 is a flow chart illustrating a shakiness correcting method, according to another embodiment. The shakiness correcting method illustrated in FIG. 6 is performed, for example, by the shakiness correcting apparatuses 100, 200 described above with reference to FIGS. 1 through 5. Thus, the shakiness correcting method described hereinafter can be easily understood with reference to the above descriptions with reference to FIGS. 1 through 5.

Referring to FIG. 6, in operation 610, the shakiness correcting apparatus 100, 200 generates motion sensing data in response to movement of the imaging apparatus 10. The operation S610 may be omitted according to another embodiment.

In operation S620, the shakiness correcting apparatus 100, 200 generates first filtering data applied to a first mode by filtering the motion sensing data to a preset first cutoff range. Also, in operation 630, the shakiness correcting apparatus 100, 200 generates second filtering data applied to a second mode by filtering the motion sensing data to a preset second cutoff range.

In operation 640, the shakiness correcting apparatus 100, 200 selectively performs shakiness correction on one of the first filtering data and the second filtering data according to mode selection information.

In an example, the operations S620 and S630 are repeatedly and continuously performed while the motion sensing data is being generated. The operations S620 and S630 are performed in parallel. For example, the operation S620 and the operation S630 may be alternately and repeatedly performed in a time division manner.

For example, the first mode may be a panning mode and the second mode may be a capture mode. In such a case, the first cutoff range is larger than the second cutoff range.

In an example, the operation S640 of performing shakiness correction includes setting the panning mode as a default setting of the mode selection information and performing optical correction using the first filtering data. In an example, the operation S640 of performing shakiness correction includes performing optical correction using the second filtering data when the mode selection information corresponds to the capture mode.

In another example, the operation S640 of performing shakiness correction includes aligning a lens in a central portion when the mode selection information is changed from information corresponding to the panning mode to information corresponding to the capture mode and performing optical correction on the lens aligned in the central portion using the second filtering data. In an example, the operation S640 of performing shakiness correction may include performing optical correction on the current lens position using the first filtering data when the mode selection information is changed from information corresponding to the capture mode to information corresponding to the panning mode.

Figure 7:
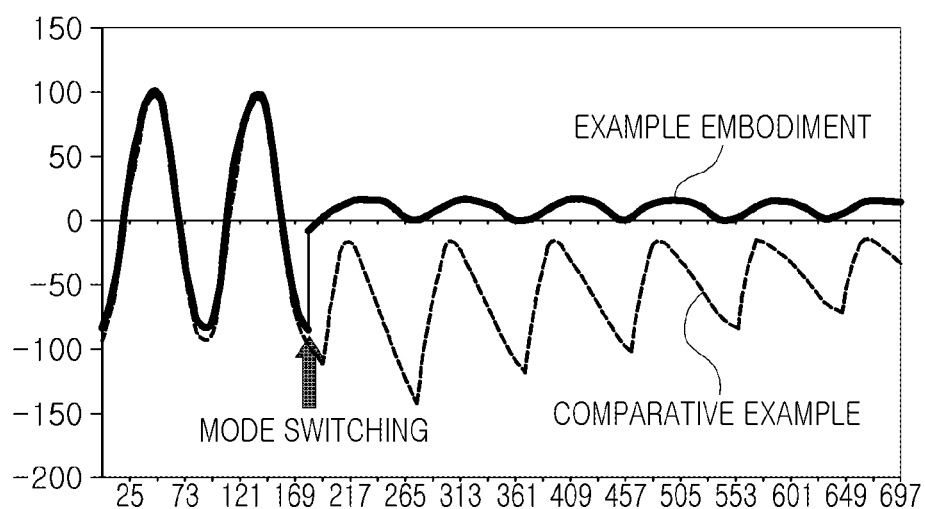
FIG. 7 is a graph illustrating pixel blur of each frame of an embodiment and a comparative example.

FIG. 7 is a graph illustrating pixel blur of each frame of an example embodiment and a comparative example. Optical image stabilization (OIS) pixel blur illustrated in FIG. 7 was measured under a condition of 1.3 degrees and 1 Hz. A frame rate was measured under a condition of 90 frames per second. In the illustrated graph, the horizontal axis represents the number of frames, and the vertical axis represents an amount of pixel blur.

The graph in FIG. 7 illustrates the example embodiment (the solid line) and the related art comparative example (the dotted line) when the shakiness correcting mode is switched from the panning mode to the capture mode at the illustrated mode switching point in time. As shown in FIG. 7, before the shakiness correcting mode is switched, that is, in the panning mode, an optical compensation angle is reduced. Thus, pixel blur at a level of 200 pixels occurs commonly in the related art comparative example and in the present example embodiment. Also, as shown in FIG. 7, after the shakiness correcting mode is switched, the two examples have different effects.

That is, it can be seen that, in the related art comparative example, since a filtering setting is required to be changed, the value of the pixel blur is gradually reduced in the form of an attenuation waveform until output of the filter is stabilized as illustrated. Thus, a relatively large amount of time is required for stabilizing the output of the filter, and even while stabilization is being performed, over-correction is also performed.

In contrast, in the embodiments disclosed herein, it can be seen that, since the individual filtering data corresponding to all of the shakiness correcting modes is generated in each of the shakiness correcting modes, when the shakiness correcting mode is switched, optical compensation is immediately performed using the changed filtering data after one frame. That is, for example, when the shakiness correcting mode is switched from the panning mode to the capture mode, optical compensation is immediately and accurately performed according to the capture mode (using the second filtering data), while the range of the pixel blur is rapidly reduced after one frame from the mode switching.

According to the embodiments disclosed herein, the shakiness correcting apparatus may provide an effect of rapidly and accurately correcting shakiness even when a panning operation and an imaging operation of a digital imaging apparatus are switched.

The apparatuses, units, modules, devices, and other components (e.g., the camera module 11, the image processor 12, the memory 13, the display 14, the sensors 110 and 210, the filters 120, 130, 220, 230 and 240, the selectors 140 and 250, and the optical correctors 150 and 260) illustrated in FIGS. 1, 2 and 5 that perform the operations described herein with respect to FIG. 6 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIG. 6. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The method illustrated in FIG. 6 that performs the operations described herein with respect to FIGS. 1, 2 and 5 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A shakiness correcting method, comprising:
generating, based on motion sensing data, first filtering data to be applied to a first mode;

generating, based on the motion sensing data, second filtering data to be applied to a second mode;

selectively performing shakiness correction on one of the first filtering data and the second filtering data according to mode selection information; and directly feeding the selected one of the first filtering data and the second filtering data to an optical image stabilization corrector to perform optical correction, wherein the generating of the first filtering data and the generating of the second filtering data are performed in a mutually parallel manner, and a lens is aligned in a central position in response to the mode selection being changed.

2. The shakiness correcting method of claim 1, further comprising:

generating the motion sensing data in response to movement of an imaging apparatus, wherein the generating of the first filtering data and the generating of the second filtering data are repeatedly and continuously performed while the motion sensing data is being generated.

3. The shakiness correcting method of claim 1, wherein the generating of the first filtering data and the generating of the second filtering data are alternately and repeatedly performed in a time division manner.

4. The shakiness correcting method of claim 1, wherein:

the generating of the first filtering data is performed by filtering the motion sensing data to a first cutoff range; and the generating of the second filtering data is performed by filtering the motion sensing data to a second cutoff range.

5. The shakiness correcting method of claim 4, wherein the first mode is a panning mode configured to correct shakiness during panning of an imaging apparatus, the second mode is a capture mode configured to correct shakiness while the imaging apparatus is in a substantially fixed position, and the first cutoff range is larger than the second cutoff range.

6. The shakiness correcting method of claim 5, wherein the performing of the shakiness correction comprises:

setting the panning mode as a default setting of the mode selection information; and performing optical correction using the first filtering data.

7. The shakiness correcting method of claim 5, wherein the performing of the shakiness correction comprises performing optical correction using the second filtering data in response to the mode selection information corresponding to the capture mode.

8. The shakiness correcting method of claim 5, wherein the performing of the shakiness correction comprises:

aligning the lens in the central position in response to the mode selection information being changed from information corresponding to the panning mode to information corresponding to the capture mode; and performing optical correction on the lens aligned in the central position using the second filtering data.

9. The shakiness correcting method of claim 5, wherein the performing of the shakiness correction comprises:

performing optical correction on a current lens position using the first filtering data in response to the mode selection information being changed from information corresponding to the capture mode to information corresponding to the panning mode.

10. A shakiness correcting apparatus, comprising:

a sensor configured to generate motion sensing data in response to movement of an imaging apparatus;

a first filter configured to filter the motion sensing data in a first way to generate first filtering data;

a second filter configured to filter the motion sensing data in a second way to generate second filtering data; and an optical image stabilization corrector configured to perform optical shakiness correction using one of the first filtering data and the second filtering data directly fed into the optical image stabilization corrector, and align a lens in a central position in response to receiving a reset signal, wherein the first filter and the second filter are configured to operate in a mutually parallel manner.

11. The shakiness correcting method of claim 10, wherein:

the filtering of the motion sensing data in the first way comprises filtering the motion sensing data to a first range; and the filtering of the motion sensing data in the second way comprises filtering the motion sensing data to a second range.

12. The shakiness correcting apparatus of claim 10, wherein the first cutoff range is larger than the second cutoff range.

13. The shakiness correcting apparatus of claim 11, wherein the first filter and the second filter are configured to operate alternately and repeatedly in a time division manner.

14. The shakiness correcting apparatus of claim 13, further comprising a multiplexing selector configured to receive the first filtering data and the second filtering data, and provide one of the first filtering data and the second filtering data directly to the optical image stabilization corrector according to mode selection information.

15. The shakiness correcting apparatus of claim 14, wherein the multiplexing selector is configured to provide the first filtering data to the optical image stabilization corrector in response to the mode selection information corresponding to a panning mode for correcting optical shakiness during panning of the imaging apparatus, and provide the second filtering data to the optical image stabilization corrector in response to the mode selection information corresponding to a capture mode for correcting optical shakiness while the imaging apparatus is in a substantially fixed position.

16. The shakiness correcting apparatus of claim 15, wherein the multiplexing selector is configured to set the panning mode as a default setting of the mode selection information.

17. The shakiness correcting apparatus of claim 15, wherein:

the multiplexing selector is configured to provide the reset signal to the optical image stabilization corrector in response to the mode selection information being changed from information corresponding to the panning mode to information corresponding to the capture mode; and the optical image stabilization corrector is further configured to perform optical correction using the second filtering data, in response to receiving the reset signal.

18. A method of generating data for shakiness correction in an imaging apparatus, the method comprising:

generating, by filtering motion sensing data in a first way, first filtering data to be applied to a first shakiness correcting mode;

generating, by filtering the motion sensing data in a second way, second filtering data to be applied to a second shakiness correcting mode;

selectively performing shakiness correction on one of the first filtering data and the second filtering data based on mode selection information; and directly feeding the selected one of the first filtering data and the second filtering data to an optical image stabilization corrector to perform optical correction, wherein the generating of the first filtering data and the generating of the second filtering data are performed parallel to each other; and a lens is aligned in a central position in response to the mode selection being changed.

19. The method of claim 18, wherein:

the filtering of the motion sensing data in the first way comprises filtering the motion sensing data to a first cutoff range; and the filtering of the motion sensing data in the second way comprises filtering the motion sensing data to a second cutoff range.

20. The method of claim 18, wherein:

the first shakiness correcting mode is a panning mode configured to correct shakiness during panning of an imaging apparatus; and the second shakiness correcting mode is a capture mode configured to correct shakiness while the imaging apparatus is in a substantially fixed position.

21. The method of claim 18, wherein the generating of the first filtering data and the generating of the second filtering data are alternately and repeatedly performed.

* * * * *